US007516591B2

(12) United States Patent
Wolner et al.

(10) Patent No.: US 7,516,591 B2
(45) Date of Patent: Apr. 14, 2009

(54) CONCRETE ANCHOR STRAP

(75) Inventors: J. Thomas Wolner, Red Wing, MN (US); Travis P. Betcher, Goodhue, MN (US)

(73) Assignee: D B Industries, Inc., Red Wing, MN (US)

( * ) Notice: Subject to any disclaimer, the term of this patent is extended or adjusted under 35 U.S.C. 154(b) by 903 days.

(21) Appl. No.: 10/819,019

(22) Filed: Apr. 6, 2004

(65) Prior Publication Data

US 2005/0257446 A1 Nov. 24, 2005

(51) Int. Cl.

| | |
|---|---|
| ***E04B 1/38*** | (2006.01) |
| ***E04B 1/00*** | (2006.01) |
| ***E04C 5/00*** | (2006.01) |
| ***E04G 21/00*** | (2006.01) |
| ***E04G 23/00*** | (2006.01) |
| ***A44B 11/25*** | (2006.01) |
| ***A44B 1/04*** | (2006.01) |
| ***A44B 15/00*** | (2006.01) |
| ***A01K 27/00*** | (2006.01) |
| ***A47L 3/04*** | (2006.01) |

(52) U.S. Cl. ................ 52/698; 52/745.21; 52/DIG. 11; 24/298; 24/302; 24/265 R; 24/265 AL; 119/795; 182/3; D29/100; D29/101.1

(58) Field of Classification Search .................. 52/698, 52/DIG. 11, DIG. 12, 741, 745.21; 182/3; 24/298, 302, 265 R, 265 A, 265 AL, 182, 24/197; D29/100, 101.1; D2/624, 627, 639, D2/640; 54/16, 34, 35; 119/795, 797, 798

See application file for complete search history.

(56) References Cited

U.S. PATENT DOCUMENTS

| | | | | |
|---|---|---|---|---|
| 1,516,292 | A * | 11/1924 | Holstein | 54/1 |
| 4,538,702 | A * | 9/1985 | Wolner | 182/3 |
| 4,632,105 | A * | 12/1986 | Barlow | 602/64 |
| 5,174,410 | A * | 12/1992 | Casebolt | 182/3 |
| 5,261,728 | A * | 11/1993 | Carmichael | 297/482 |
| D367,949 | S * | 3/1996 | Vallance | D29/100 |
| 5,983,760 | A * | 11/1999 | Clarke | 81/436 |
| 6,038,745 | A * | 3/2000 | Rapp | 24/68 R |
| D449,136 | S * | 10/2001 | Vallance | D29/124 |
| D454,670 | S * | 3/2002 | Weller | D30/153 |
| 6,581,726 | B1 * | 6/2003 | Petzl et al. | 182/7 |
| 6,637,077 | B2 * | 10/2003 | Doty | 24/302 |

* cited by examiner

*Primary Examiner*—Brian E. Glessner
*Assistant Examiner*—Hunter M Dreidame
(74) *Attorney, Agent, or Firm*—IPLM Group, P.A.

(57) ABSTRACT

A reusable concrete anchor strap includes a strap having a first end, a second end, a middle portion, and an intermediate portion. The first end and the second end are proximate a connector end and the middle portion forms a first loop member proximate an anchor end. The intermediate portion is a first segment between the first end and the middle portion and a second segment between the second end and the middle portion. A securement member secures and interconnects the first segment and the second segment to form a second loop member thereby allowing for reuse of the strap when the first loop member is disconnected to create a second anchor end proximate the second loop member. The first loop member and the second loop member are configured and arranged to engage at least one anchor member of a concrete structure.

13 Claims, 3 Drawing Sheets

CONCRETE ANCHOR STRAP

BACKGROUND OF THE INVENTION

1. Field of the Invention

The present invention relates to a concrete anchor strap for use with a concrete structure including an anchor member.

2. Description of the Prior Art

Embedded concrete anchor straps are used as anchorage points for various types of fall arrest systems and fall protection systems. For example, when used with a fall arrest system, the fall arrest system typically includes a full body safety harness worn by the user and a connecting subsystem such as an energy absorbing lanyard or a self-retracting lifeline interconnecting the full body safety harness and the concrete anchor strap.

As concrete is being poured, steel reinforcing bars (rebars) are typically used to strengthen the concrete structure. Concrete anchor straps may be looped about the rebars as the concrete is being poured and once the concrete has cured, a portion of the concrete anchor strap extends from the concrete to provide an anchorage point. The user may then connect to the concrete anchor strap while performing tasks proximate the concrete anchor strap. After the fall hazard has been eliminated, the concrete anchor strap is typically disconnected by cutting it proximate the concrete seam and then it is discarded.

In addition, the concrete anchor strap may be used to lift the concrete structure and when the concrete structure is in place, the concrete anchor strap may be disconnected by cutting it and then it is discarded.

SUMMARY OF THE INVENTION

In a preferred embodiment reusable concrete anchor strap for use with a concrete structure including at least one anchor member, a strap has an anchor end, a connector end, and an intermediate portion. A first loop member is operatively connected to the anchor end, and the first loop member is configured and arranged to engage the at least one anchor member of the concrete structure. A second loop member is operatively connected to the intermediate portion, and the second loop member allows for reuse of the strap when the first loop member is disconnected proximate the anchor end to create a second anchor end proximate the second loop member. The second loop member is configured and arranged to engage the at least one anchor member of the concrete structure.

In a preferred embodiment concrete anchor strap for use with a concrete structure including at least one anchor member, a strap has a first end, a second end, and a middle portion. The strap is folded so that the first end and the second end are proximate a connector end and the middle portion forms a first loop member proximate an anchor end. The first loop member is configured and arranged to engage the at least one anchor member of the concrete structure. A connector is operatively connected to the connector end.

In a preferred embodiment reusable concrete anchor strap for use with a concrete structure including at least one anchor member, a strap has a first end, a second end, a middle portion, and an intermediate portion. The strap is folded so that the first end and the second end are proximate a connector end and the middle portion forms a first loop member proximate an anchor end. The intermediate portion is a first segment and a second segment of the strap, the first segment being between the first end and the middle portion, and the second segment being between the second end and the middle portion. The first loop member is configured and arranged to engage the at least one anchor member of the concrete structure. A securement member secures the intermediate portion of the strap and interconnects the first segment and the second segment. The securement member forms a second loop member with the first segment and the second segment thereby allowing for reuse of the strap when the first loop member is disconnected proximate the securement member to create a second anchor end proximate the second loop member. The second loop member is configured and arranged to engage the at least one anchor member of the concrete structure.

In a preferred embodiment method of securing a reusable concrete anchor strap to at least one anchor member in a concrete structure, an anchor end of a strap is placed about the at least one anchor member thereby engaging the at least one anchor member. Concrete is poured over the anchor end of the strap and the at least one anchor member, and the concrete is allowed to cure thereby securing the anchor end of the strap to the at least one anchor member within the cured concrete. The strap is disconnected between the concrete and a securement member thereby creating a second anchor end, the second anchor end allowing the strap to be reused.

DETAILED DESCRIPTION OF A PREFERRED EMBODIMENT

Figure 1:
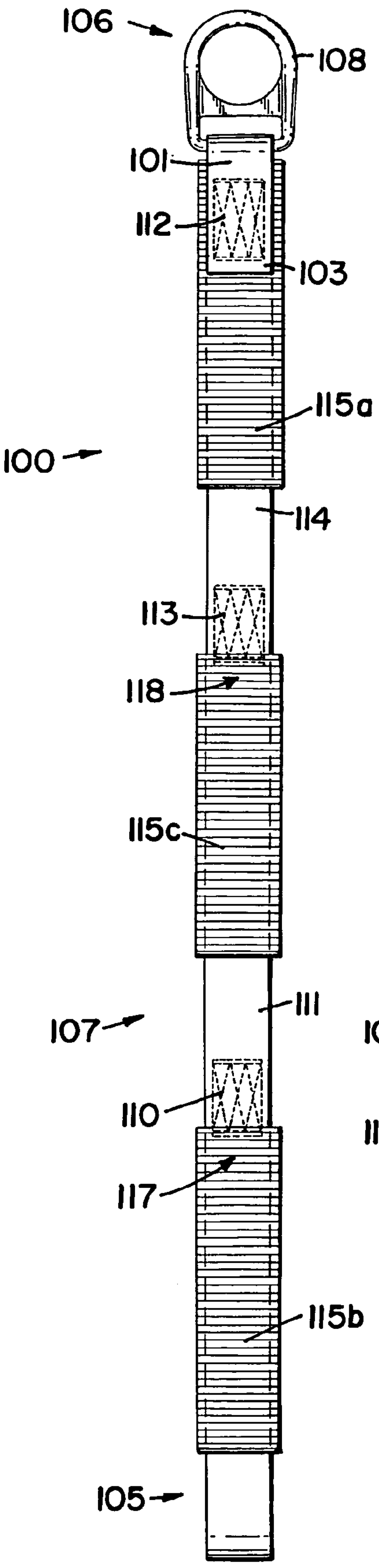
FIG. 1 is a front view of a concrete anchor strap constructed according to the principles of the present invention.

A preferred embodiment concrete anchor strap constructed according to the principles of the present invention is designated by the numerals 100 and 300 in the drawings.

Figure 2:
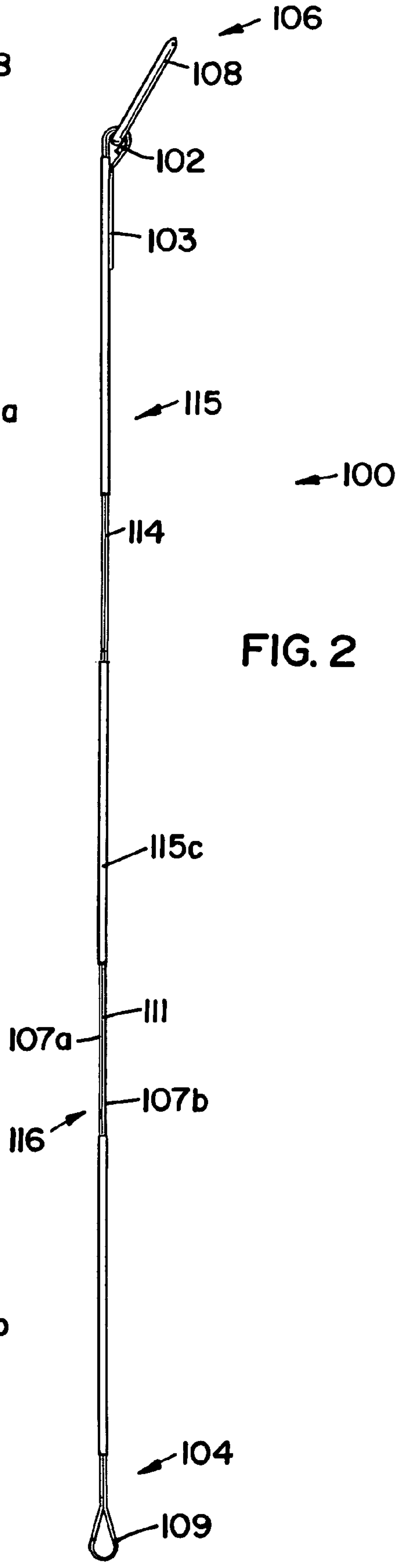
FIG. 2 is a side view of the concrete anchor strap shown in FIG. 1.

The concrete anchor strap 100, as shown in FIGS. 1 and 2, includes a strap 101 preferably made of a 1¾ inch wide polyester webbing having a first end 102, a second end 103, a middle portion 104, and an intermediate portion 107. The strap 101 is preferably folded over to form a double layer of webbing with one piece of webbing. The first end 102 and the second end 103 are at one end of the strap 101 proximate a connector end 106, and the middle portion 104 forms a first loop member 109 at the opposite end of the strap 101 proximate an anchor end 105. In other words, the first end 102 and the second end 103 are brought together to form a double layer of webbing, and the webbing forms a first loop member 109 at the opposite end. One benefit of the double layer of webbing is that it provides added strength in the concrete anchor strap 100, which provides a fall arrest anchorage point up to 5,000 pounds of force. The first loop member 109 is configured and arranged to engage an anchor member 201 in a concrete structure 200.

The intermediate portion 107 includes a first segment **107*a* and a second segment 107*b*. The first segment 107*a* is a portion of the strap 101 between the second end 103 and the middle portion 104, and the second segment 107*b* is a portion of the strap 101 between the first end 102 and the middle portion 104. A securement member 110 secures the intermediate portion 107 of the strap 101 and interconnects the first segment 107***a* and the second segment 107*b* forming a second loop member 111 between the first segment 107*a* and the second segment 107*b*, which allows for reuse of the strap 101 when the first loop member 109 is disconnected proximate the securement member 110 to create a second anchor end proximate the second loop member 111. The securement member 110 is located between the anchor end 105 and the connector end 106, and the second loop member 111 is located between the securement member 110 and the connector end 106. Proximate the securement member 110 and the anchor end 105 is a separation area 117 where the first loop member 109 may be disconnected after use. The first loop member 109 is disconnected between the securement member 110 and the anchor end 105 to create a second anchor end proximate the second loop member 111. The second loop member 111 is configured and arranged to engage an anchor member 201 in a concrete structure 200.

Similarly, a securement member 113 may also be used to form a third loop member 114. The securement member 113 is located between the securement member 110 and the connector end 106, and the third loop member 114 is located between the securement member 113 and the connector end 106. Proximate the securement member 113 and the second anchor end is a separation area 118 where the second loop member 111 may be disconnected after use thereby creating a third anchor end proximate the third loop member 114. The second loop member 111 is disconnected between the securement member 113 and the second anchor end to create the third anchor end. The third loop member 114 is configured and arranged to engage an anchor member 201 in a concrete structure 200.

An optional sleeve 115 may be used with the concrete anchor strap 100. The sleeve 115 is preferably tubular webbing through which the strap 101 is inserted. The sleeve 115 encases a portion of the strap 101 and provides wear resistance on the strap 101. In other words, sleeve 115 acts as a wear pad for abrasion resistance on the strap 101 during use of the concrete anchor strap 100. The sleeve 115 preferably extends from proximate the connector end 106 to proximate the anchor end 105. The securement members interconnect the strap 101 and the sleeve 115. The sleeve 115 may include interruptions 116, and the securement members preferably span the portion of the strap 101 not covered by the sleeve 115 and the sleeve 115 thereby interconnecting the strap 101 and the sleeve 115. In other words, the securement members begin on the strap 101 and extend into the sleeve 115 encasing the strap 101. Not only do the securement members secure the strap 101 and form loop members, but the securement members also keep the sleeve 115 in place on the strap 101. The optional interruptions 116 in the sleeve 115 and the securement members allow for easy reuse of the concrete anchor strap, and it is recognized that any number of interruptions 116 may be included to allow for reuse a corresponding number of times.

The sleeve 115 includes a first portion 115*a*, a second portion 115*b*, and a third portion 115*c* separated by the interruptions 116. The first portion 115*a* extends from proximate the securement member 112 to proximate the third loop member 114. The second portion 115*b* extends from proximate the securement member 110 to proximate the first loop member 109. The third portion 115*c* extends from proximate the securement member 113 to proximate the second loop member 111. The sleeve portions and the interruptions 116 provide easy access to the loop members for reuse of the strap.

The connector end 106 is operatively connected to a connector 108, which is preferably a D-ring to provide a compatible connection point for a connecting subsystem such as a lanyard or a self-retracting lifeline. The connector 108 could also be a loop in the webbing or any other suitable device known in the art. The first end 102 and the second end 103 are inserted through a slot in the D-ring and then operatively connected to the webbing and the optional sleeve 115 with a securement member 112, which is preferably stitching through the webbing and the sleeve 115. As shown in FIG. 2, the first end 102 terminates proximate the slot in the D-ring and the second end 103 extends past the D-ring and overlaps the webbing. More specifically, the first end 102 is secured by stitching on one side of the D-ring in one location on the webbing and the sleeve 115 and the second end 103 is secured by stitching on both sides of the D-ring in two locations on the webbing and the sleeve 115. In other words, the stitching is sewn through the webbing and the sleeve to secure the first end 102 (in one location) and the second end 103 (in two locations) to the sleeve. However, it is recognized that either one end or both ends of the webbing may be secured by stitching on both sides of the D-ring (in two locations).

Figure 3:
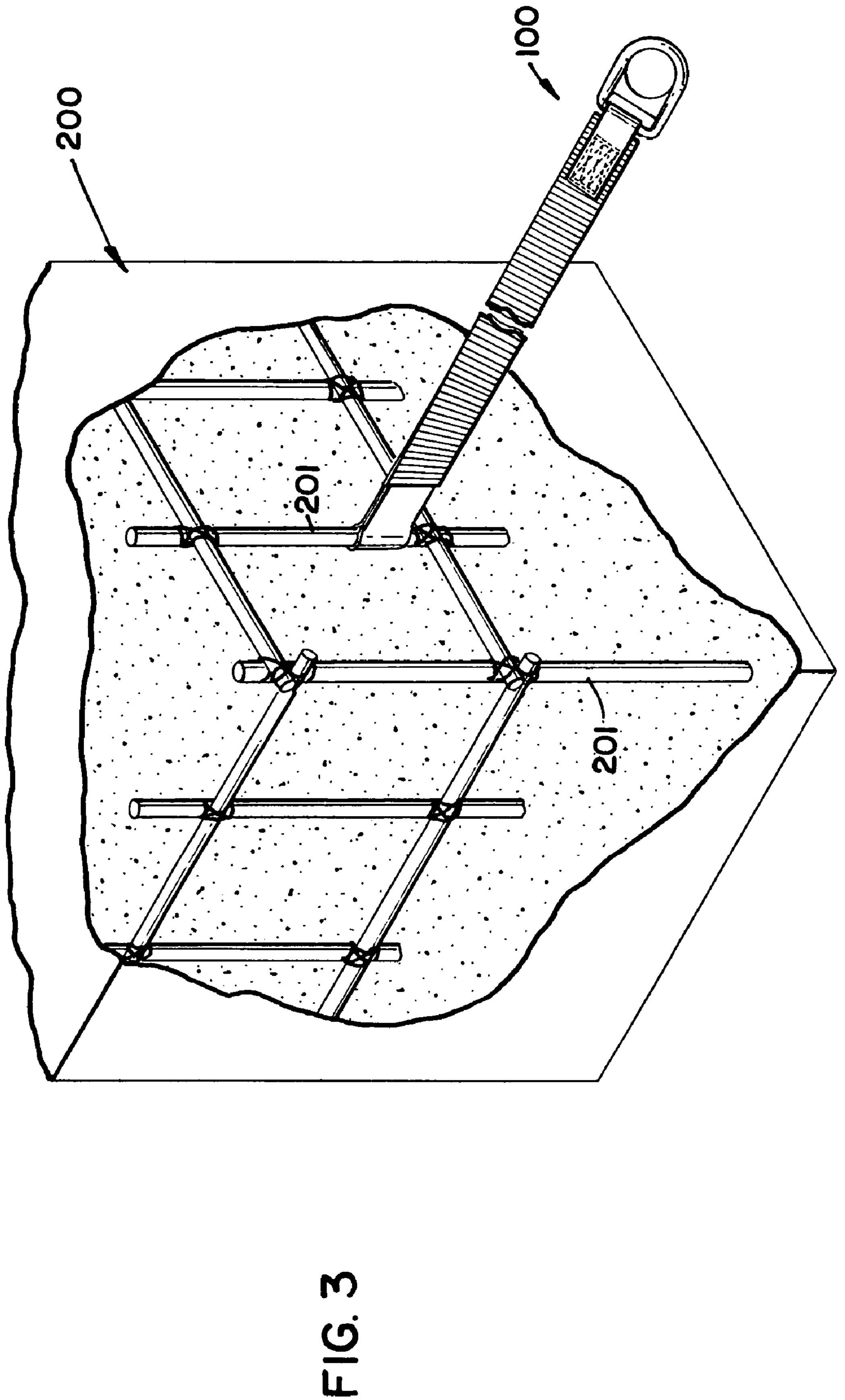
FIG. 3 is a concrete structure including anchor members with which the concrete anchor strap shown in FIGS. 1 and 4 may be used.

In operation, as shown in FIG. 3, a concrete structure 200 includes an anchor member 201, which is preferably a rebar. It is recognized that the anchor member could be rebars, loops, or other structures well known in the art. The first loop member 109 is positioned about the anchor member 201 in a desired position and/or orientation. Concrete is then poured over the first loop member 109 and the second portion 115*b* of the sleeve 115. The concrete is then allowed to cure and solidify. Once the concrete is cured, the first loop member 109 is secured to the anchor member 201 thereby providing an anchorage point. The user may interconnect the D-ring and the user's safety harness with a lanyard, a self-retracting lifeline, or other suitable device well known in the art. During use of the strap 101, the sleeve 115 provides wear resistance for the strap 101. When the anchorage point is no longer needed, the concrete anchor strap 100 may be disconnected by simply cutting the strap 101 proximate the separation area 117. This releases the portion of the strap 101 that is not embedded into the concrete. The portion of the strap 101 embedded into the concrete is left in the concrete. The second loop member 111 may then be similarly secured to an anchor member to provide another anchorage point. When this anchorage point is no longer needed, the concrete anchor strap 100 may be disconnected by simply cutting the strap 101 proximate the separation area 118. The third loop member 114 may then be similarly secured to an anchor member to provide yet another anchorage point. Again, when this anchorage point is no longer needed, the concrete anchor strap 100 may be disconnected by simply cutting the strap 101 proximate the concrete. The concrete anchor strap 100 may then be discarded.

The concrete anchor strap 100 is reusable and then disposable. 10 Alternatively, rather than having a double thick webbing secured together to create the loop members, the loop members could be a separate member operatively connected to a strap by stitching, rivets, or other connecting members well known in the art. The loop members could also be incorporated into a single layer of webbing and formed by the single layer of webbing. For example, loops could be formed with the webbing and secured to form the loop members. When reuse of the strap is desired, the strap would be cut below the next loop member until there are no longer any loop members remaining, at which point the strap would be discarded.

Figure 4:
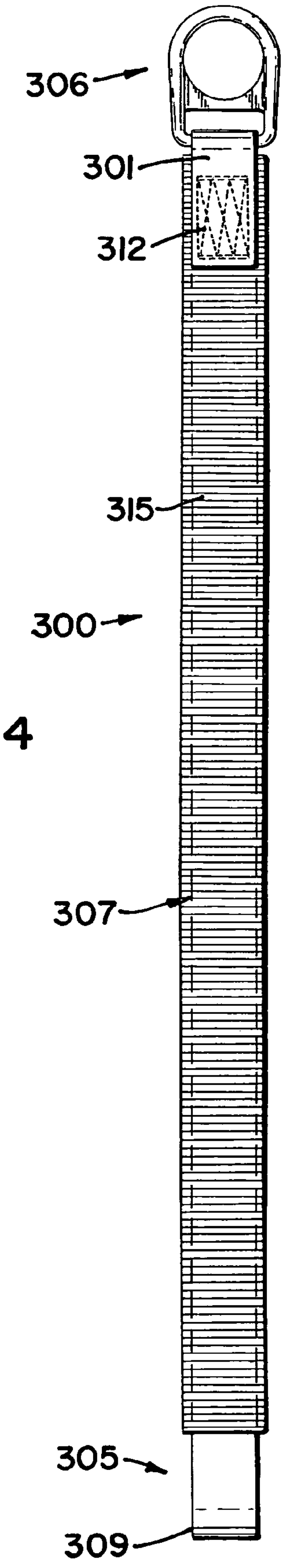
FIG. 4 is a front view of another embodiment concrete anchor strap constructed according to the principles of the present invention.
Figure 5:
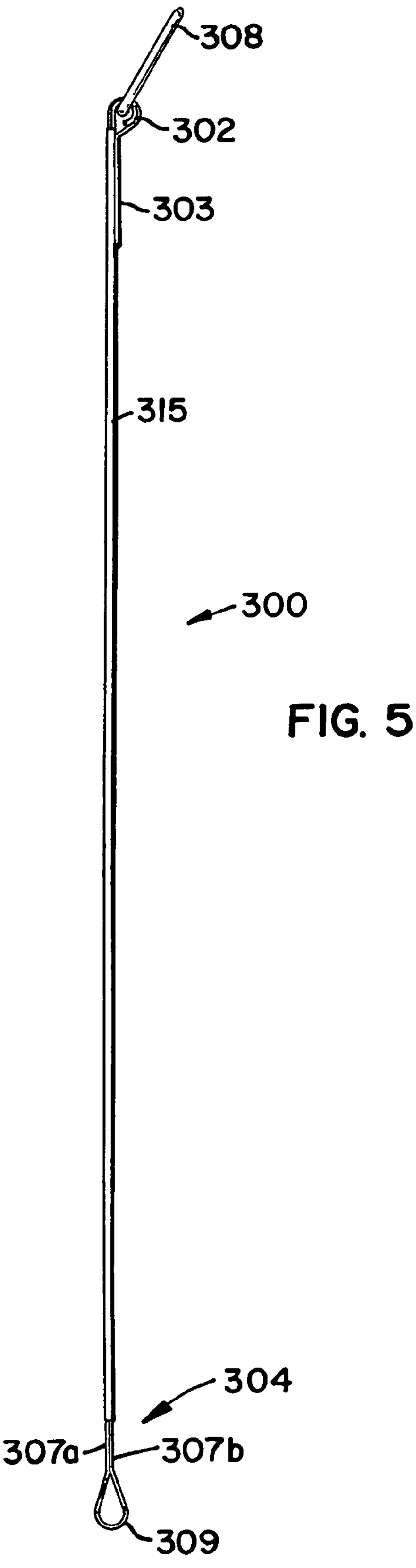
FIG. 5 is a side view of the concrete anchor strap shown in FIG. 5.

The concrete anchor strap 300, as shown in FIGS. 4 and 5, includes a strap 301 preferably made of a 1¾ inch wide polyester webbing having a first end 302, a second end 303, a middle portion 304, and an intermediate portion 307. The strap 301 is preferably folded over to form a double layer of webbing with one piece of webbing. The first end 302 and the second end 303 are at one end of the strap 301 proximate a connector end 306, and the middle portion 304 forms a loop member 309 at the opposite end of the strap 301 proximate an anchor end 305. In other words, the first end 302 and the second end 303 are brought together to form a double layer of webbing, and the webbing forms a loop member 309 at the opposite end. One benefit of the double layer of webbing is that it provides added strength in the concrete anchor strap 300, which provides a fall arrest anchorage point up to 5,000 pounds of force. The loop member 309 is configured and arranged to engage an anchor member in a concrete structure.

The intermediate portion 307 includes a first segment 307*a* and a second segment 307*b*. The first segment 307*a* is a portion of the strap 301 between the second end 303 and the middle portion 304, and the second segment 307*b* is a portion of the strap 301 between the first end 302 and the middle portion 304.

An optional sleeve 315 may be used with the concrete anchor strap 300. The sleeve 315 is preferably tubular webbing through which the strap 301 is inserted. The sleeve 315 encases a portion of the strap 301 and provides wear resistance on the strap 301. In other words, sleeve 315 acts as a wear pad for abrasion resistance on the strap 301 during use of the concrete anchor strap 300. The sleeve 315 preferably extends from proximate the connector end 306 to proximate the anchor end 305. A securement member 312 interconnects the strap 301 and the sleeve 315.

The connector end 306 is operatively connected to a connector 308, which is preferably a D-ring to provide a compatible connection point for a connecting subsystem such as a lanyard or a self-retracting lifeline. The first end 302 and the second end 303 are inserted through a slot in the D-ring and then operatively connected to the webbing and the optional sleeve 315 with the securement member 312, which is preferably stitching through the webbing and the sleeve 315. As shown in FIG. 5, the first end 302 terminates proximate the slot in the D-ring and the second end 303 extends past the D-ring. In other words, the first end 302 is secured by stitching on one side of the D-ring in one location on the webbing and the sleeve 315 and the second end 303 is secured by stitching on both sides of the D-ring in two locations on the webbing and the sleeve 315. However, it is recognized that either one end or both ends of the webbing may be secured by stitching on both sides of the D-ring.

In operation, a concrete structure includes an anchor member, which is preferably a rebar. It is recognized that the anchor member could be rebars, loops, or other structures well known in the art. The loop member 309 is positioned about the anchor member in a desired position and/or orientation. Concrete is then poured over the loop member 309 and a portion of the sleeve 315. The concrete is then allowed to cure and solidify. Once the concrete is cured, the loop member 309 is secured to the anchor member thereby providing an anchorage point. The user may interconnect the D-ring and the user's safety harness with a lanyard, a self-retracting lifeline, or other suitable device well known in the art. During use of the strap 301, the sleeve 315 provides wear resistance for the strap 301. When the anchorage point is no longer needed, the concrete anchor strap 300 may be disconnected by simply cutting the strap 301 proximate the concrete. This releases the portion of the strap 301 that is not embedded into the concrete. The portion of the strap 301 embedded into the concrete is left in the concrete. The strap 101 may then be discarded.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A reusable concrete anchor strap for use with a concrete structure including at least one anchor member, comprising:

a) a strap having a first end, a second end, a middle portion, and an intermediate portion, said strap being folded so that said first end and said second end are proximate a connector end and said middle portion forms a first loop member proximate an anchor end, said intermediate portion being a first segment and a second segment of said strap, said first segment being between said first end and said middle portion, said second segment being between said second end and said middle portion, said first loop member being configured and arranged to engage the at least one anchor member of the concrete structure;

b) a securement member securing said intermediate portion of said strap and interconnecting said first segment and said second segment, said securement member forming a second loop member with said first segment and said second segment thereby allowing for reuse of said strap when said first loop member is disconnected proximate said securement member to create a second anchor end proximate said second loop member, said second loop member being configured and arranged to engage the at least one anchor member of the concrete structure; and c) a second securement member securing said intermediate portion of said strap and interconnecting said first segment and said second segment, said second securement member forming a third loop member with said first segment and said second segment thereby allowing for reuse of said strap when said second loop member is disconnected proximate said second securement member to create a third anchor end proximate said third loop member, said third loop member being configured and arranged to engage the at least one anchor member of the concrete structure.

2. The reusable concrete anchor strap of claim 1, further comprising a sleeve configured and arranged to cover a first portion of said strap, said sleeve having interruptions, said interruptions exposing a second portion of said strap proximate said securement member and said second loop member, said second loop member being accessible, said interruptions allowing said first loop member to be disconnected with a portion of said sleeve proximate said securement member and said first loop member.

3. A concrete anchor assembly, comprising:

a) a concrete structure including at least one anchor member;

b) a strap having a first end, a second end, and a middle portion, said strap being folded so that said first end and said second end are proximate a connector end and said middle portion forms a first loop member proximate an anchor end, said first loop member being configured and arranged to engage the at least one anchor member of the concrete structure;

c) a connector operatively connected to said connector end; and d) concrete securing the first loop member to the at least one anchor member of the concrete structure, wherein a portion of said middle portion and the connector end extend outward from the concrete.

4. The concrete anchor assembly of claim 3, further comprising a securement member securing an intermediate portion of said strap, said securement member forming a second loop member thereby allowing for reuse of said strap when said first loop member is disconnected proximate said securement member to create a second anchor end proximate said second loop member, said second loop member being configured and arranged to engage the at least one anchor member of the concrete structure.

5. The concrete anchor assembly of claim 4, wherein said securement member secures said strap between said anchor end and said connector end, said securement member forming said second loop member between said securement member and said connector end, said first loop member being disconnected between said securement member and said anchor end.

6. The concrete anchor assembly of claim 5, further comprising a second securement member securing said intermediate portion of said strap between said securement member and said connector end, said second securement member forming a third loop member between said second securement member and said connector end thereby allowing for reuse of said strap when said second loop member is disconnected between said second securement member and said securement member to create a third anchor end proximate said third loop member, said third loop member being configured and arranged to engage the at least one anchor member of the concrete structure.

7. The concrete anchor assembly of claim 4, further comprising a sleeve configured and arranged to cover a first portion of said strap.

8. The concrete anchor assembly of claim 7, further comprising interruptions in said sleeve, said interruptions exposing a second portion of said strap proximate said securement member and said second loop member, said interruptions allowing said first loop member to be disconnected with a portion of said sleeve proximate said securement member and said first loop member.

9. The concrete anchor assembly of claim 3, wherein said connector is a D-ring.

10. A method of securing a reusable concrete anchor strap to at least one anchor member in a concrete structure, comprising:

a) placing an anchor end of a strap about the at least one anchor member thereby engaging the at least one anchor member;

b) pouring concrete over the anchor end of the strap and the at least one anchor member;

c) allowing the concrete to cure thereby securing the anchor end of the strap to the at least one anchor member within the cured concrete; and d) disconnecting the strap between the concrete and a securement member thereby creating a second anchor end, the second anchor end allowing the strap to be reused.

11. The method of claim 10, further comprising placing the second anchor end of the strap about a second anchor member.

12. The method of claim 10, further comprising connecting to a connector end of the strap after allowing the concrete to cure and before disconnecting the strap.

13. The method of claim 12, further comprising using the strap as an anchorage point after connecting to the connector end and before disconnecting the strap.

* * * * *

UNITED STATES PATENT AND TRADEMARK OFFICE

CERTIFICATE OF CORRECTION

PATENT NO. : 7,516,591 B2
APPLICATION NO. : 10/819019
DATED : April 14, 2009
INVENTOR(S) : J. Thomas Wolner and Travis P. Betcher It is certified that error appears in the above-identified patent and that said Letters Patent is hereby corrected as shown below:

Column 4, Line 53:
Please insert -- The concrete anchor strap 100 is reusable and then disposable. --.

Column 4, Lines 54-55:
Please delete “The concrete anchor strap 100 is reusable and then disposible. 10”.

Signed and Sealed this

First Day of December, 2009

David J. Kappos

David J. Kappos
*Director of the United States Patent and Trademark Office*